J. DANNER.
Cultivator.
No. 37,219. Patented Dec. 23, 1862.
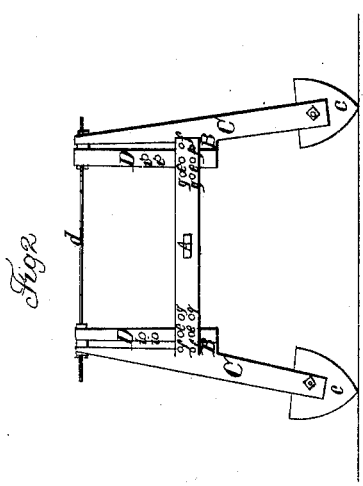
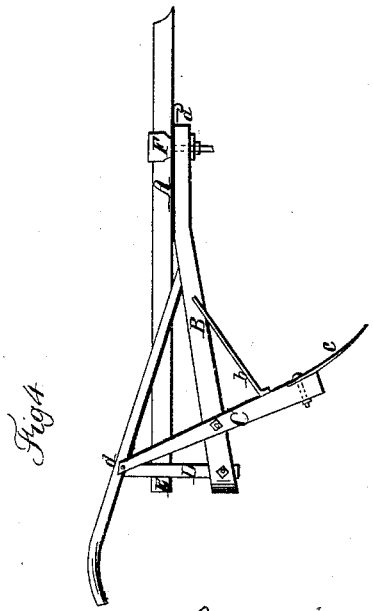
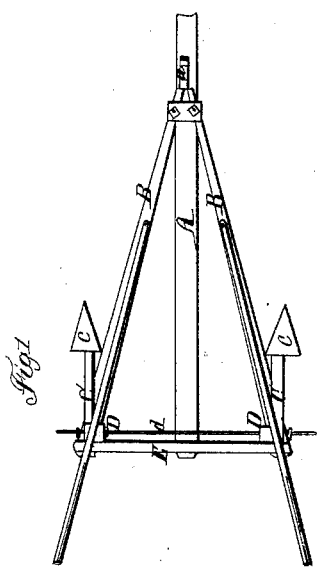
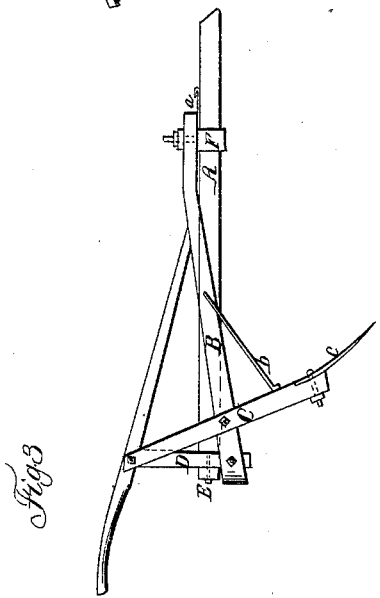
Witnesses,
Wm M Wilson
Peter G Sauleny
Inventor.
Josephus Danner

UNITED STATES PATENT OFFICE.

JOSEPHUS DANNER, OF MILTON, ILLINOIS.

IMPROVEMENT IN CULTIVATORS.

Specification forming part of Letters Patent No. 37,219, dated December 23, 1862.

*To all whom it may concern:*

Be it known that I, JOSEPHUS DANNER, of Milton, in the county of Coles and State of Illinois, have invented a new and useful Improvement in Corn Plows or Cultivators; and I do hereby declare that the following is a full, clear, and exact description thereof, reference being had to the accompanying drawings, and to the letters and figures marked thereon, which form a part of this specification, in which drawings—

Figure 1 represents a plan or top view of my invention; Fig. 2, an end view of the rear of the same; Fig. 3, a side view thereof, and Fig. 4 a side view thereof, showing the position of the parts when the draft-pole is placed above the regulating-bars.

Similar letters in the different figures represent corresponding parts of my invention, which has reference to that kind of cultivators which are drawn by two horses, and which stride the rows of corn while in operation.

The nature of my invention consists in having a two-horse cultivator or corn-plow so constructed that it can be readily gaged to adapt it to suit rows of corn of different distances apart, or to corn of different sizes, and also by a simple and ready change in the relative position of certain parts to vary the height thereof to adapt it to corn of different heights.

To enable those skilled in the art to make and use my improved corn-plow, I will now proceed to describe the same with particularity.

In the accompanying drawings, A represents the tongue or draft-pole; B, adjustable regulating-bars for regulating the distance between the plowshares c.

C are standards attached to the adjustable bars B, to which the shares c are fastened.

D are supports for the handles, and also form a gage to regulate the height of the draft-pole A.

a is the draft-hook.

b are braces to strengthen and support the standards C, and E is a cross-bar into which the rear end of the draft-pole is fixed, and also serves as a gage to regulate the width of the bars B, F being a strap or band which confines the front ends of the regulating-bars to the tongue, and d is a rod passing through the handles and the upper ends of C and D.

Fig. 3 represents the plow arranged for cultivating the corn the first time, and Fig. 4 shows it when arranged so as to run higher from the ground, being adapted to cultivating corn at the last, when it has grown up too tall for the other or low-gaged arrangement.

To alter the width of my corn-plow the pins e are withdrawn and the bars B spread apart and fastened at f, or brought together and fastened at g. To change the height of the plow from the ground to the bars B the strap F is removed, and also the pins e. The bars B are then placed under the draft-pole and the draft-hook also placed below the same, and the strap F placed over the whole, confining the whole, as seen in Fig. 4. The cross-bar E is then fastened to D at i, when it will be found that this arrangement has made the tongue A about eight inches higher than before, and as the distance of the holes i is equal to the thickness of the tongue, the forward pitch or inclination remains the same as before. The handles being firmly attached to the beams or bars B, of course run narrower or wider as the bars B are varied.

As the plowshares c are situated directly opposite each other relative to the cultivator, the earth is thrown up around the corn at exactly the same time, and so does not knock the corn over, as is always the case when the shares are arranged alternately, but leaves the stalk standing upright, although the earth should be heaped to the top of the corn. The draft-pole being rigidly attached, causes the plow to run very steadily, and the shares c scour much better.

By the arrangement of the parts it can readily be seen that the horses can be attached so as to have the plow run very near them, and thus enable the farmer to turn around on very little space at the end of each row. As the horses walk between the rows on each side of the row being cultivated, they need very little attention in driving.

What I claim as my invention is—

The combination and arrangement of the draft-pole A, the adjustable beams B, the standards C and shares c, the supports D, and the bar E and the strap F, or its equivalent, all arranged and constructed substantially as and for the purposes delineated and set forth.

JOSEPHUS DANNER.

Witnesses:
WILLIAM B. HAWKINS,
BENJAMIN E. HILLIGOSS.